United States Patent [19]

Gardner

[11] Patent Number: 5,330,212
[45] Date of Patent: Jul. 19, 1994

[54] COLLAPSIBLE WHEELED CARRIER FOR DUCK AND GOOSE DECOYS AND THE LIKE

[76] Inventor: William Gardner, 940 Hazel Ave., Campbell, Calif. 95008

[21] Appl. No.: 3,792

[22] Filed: Jan. 13, 1993

[51] Int. Cl.$^5$ .............................................. B62B 1/20
[52] U.S. Cl. .................................. 280/40; 280/47.24; 280/652; 280/659
[58] Field of Search ................. 280/40, 9, 38, 39, 651, 280/652, 659, 43, 47.18, 47.21, 47.24, 43.1

[56] References Cited

U.S. PATENT DOCUMENTS

| | | |
|---|---|---|
| 2,183,066 | 12/1939 | Fields . |
| 3,073,614 | 1/1963 | Zinneman . |
| 3,222,100 | 12/1965 | Lindzy ..................... 280/47.24 X |
| 3,913,762 | 10/1975 | Alexander ................. 280/47.24 X |
| 4,045,040 | 8/1977 | Fails . |
| 4,373,737 | 2/1983 | Cory . |
| 4,705,280 | 11/1987 | Burns ........................... 280/40 |
| 4,728,244 | 3/1988 | Stokkendal . |
| 4,789,180 | 12/1988 | Bell ............................... 280/652 |
| 4,790,559 | 12/1988 | Edmonds ..................... 280/659 X |
| 4,806,063 | 2/1989 | York . |
| 4,822,065 | 4/1989 | Enders ......................... 280/40 X |
| 5,028,060 | 7/1991 | Martin ........................... 280/39 |

FOREIGN PATENT DOCUMENTS

| | | | |
|---|---|---|---|
| 2743361 | 4/1978 | Fed. Rep. of Germany ...... 280/652 |
| 190668 | 12/1922 | United Kingdom ................. 280/40 |

Primary Examiner—David M. Mitchell
Assistant Examiner—Gary C. Hoge
Attorney, Agent, or Firm—John J. Leavitt

[57] ABSTRACT

Presented is a wheeled carrier defining a nacelle within which may be carried articles to be transported, such as duck and goose decoys. The carrier includes a main frame joined by a bottom frame structure to form the nacelle. Wheel assemblies are pivotally mounted on the main frame and may be attached or detached from the bottom frame structure for use or for storage.

8 Claims, 3 Drawing Sheets

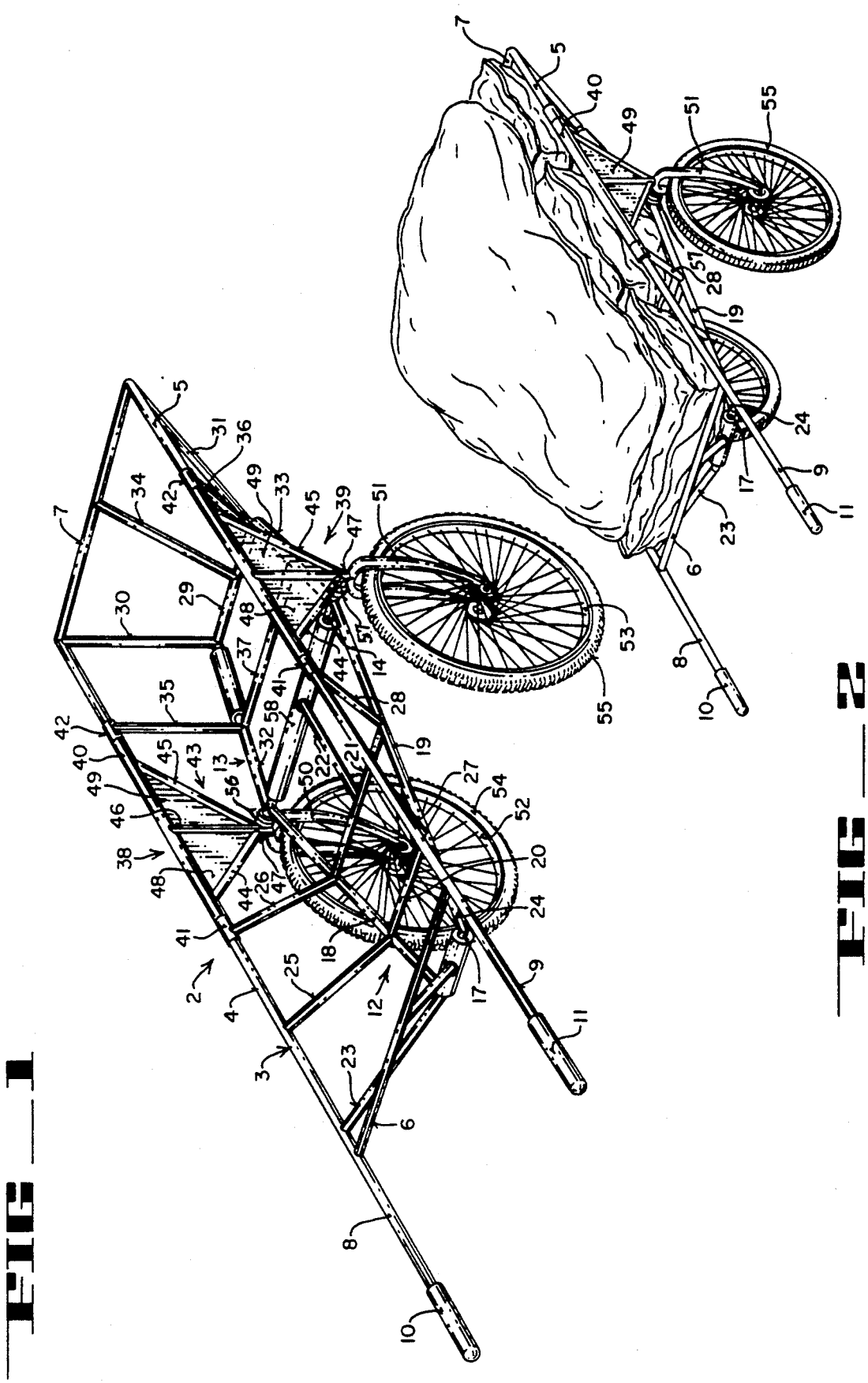

FIG_3
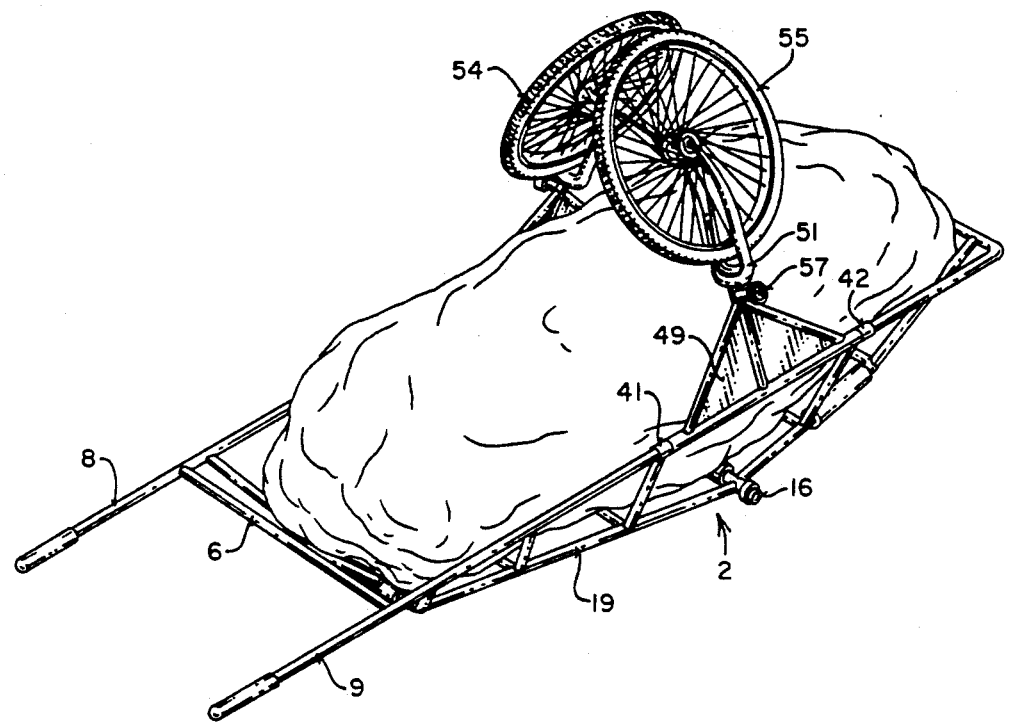
FIG_4
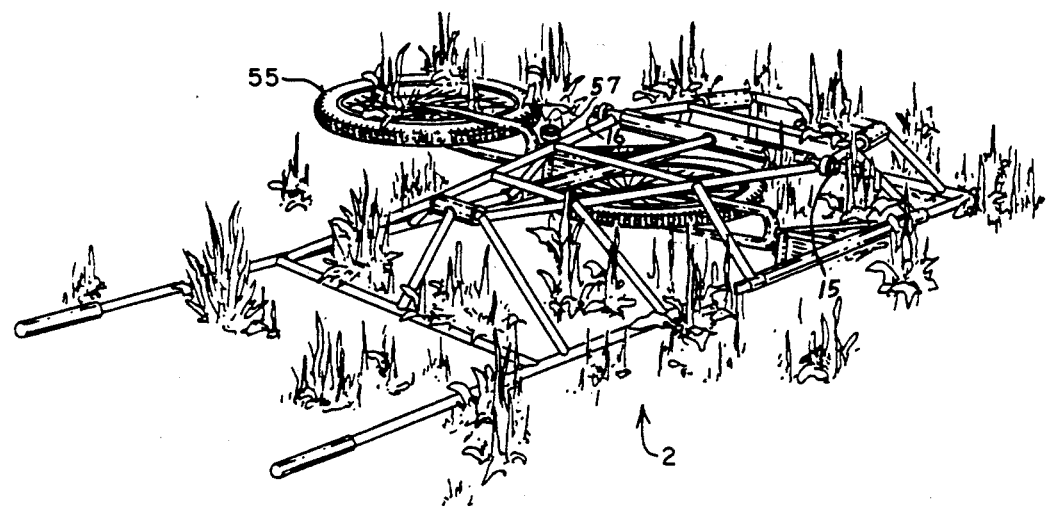

FIG_5
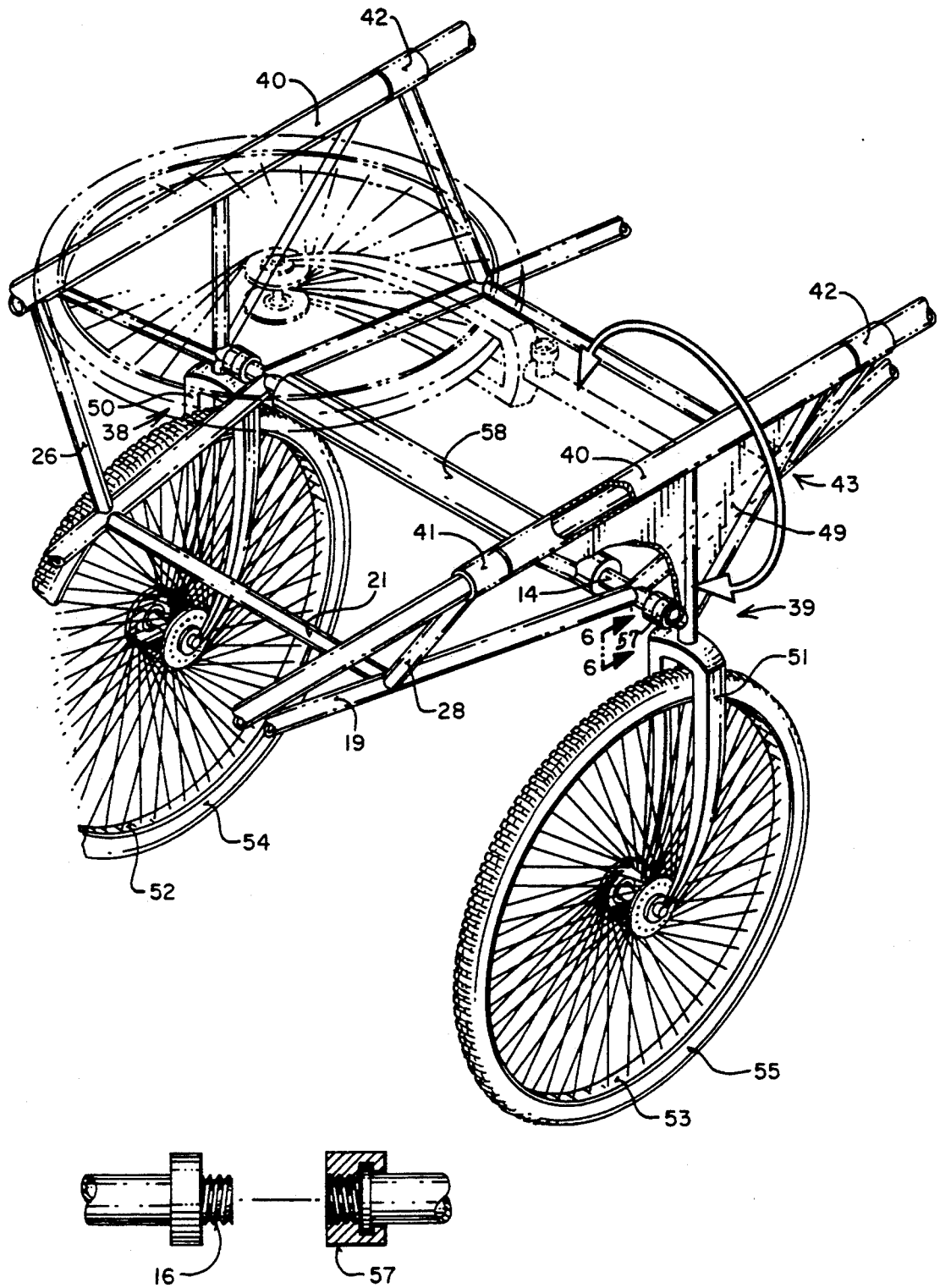
FIG_6

COLLAPSIBLE WHEELED CARRIER FOR DUCK AND GOOSE DECOYS AND THE LIKE

BACKGROUND OF THE INVENTION

1. Field of the Invention

This invention relates to carrier vehicles, and more particularly to a collapsible wheeled carrier that may conveniently be handled by one person in both its extended and collapsed form.

2. Description of the Prior Art

A preliminary patentability and novelty search has indicated the existence of the following United States patents:

| | | |
|---|---|---|
| 2,183,066 | 3,073,614 | 4,045,040 |
| 4,373,737 | 4,728,244 | 4,806,063 |

It requires only a cursory review of the above-listed patents to show that the structure, function, and mode of operation of the invention forming the subject matter hereof is significantly different from the structures illustrated and described in the noted patents.

Referring to the above-listed patents in the order of their issuance, it is noted that U.S. Pat. No. 2,183,066 is directed to a two-wheel hand cart in the nature of a wheel barrow, but provided with a frame pivotally mounted on two handle bars in a manner to enable maintaining the frame relatively horizontal with respect to the surface over which the cart is wheeled simply by manipulation of one of the handle bars. The frame is utilized for carrying a game carcass, but is not collapsible to enable the cart to be easily carried on the top of an automobile, or to be submerged in a body of water so that it cannot be seen from the air.

U.S. Pat. No. 3,073,614 discloses a combination game cart and chair, and has the advantage that it can be easily disassembled to facilitate transport. However, the structure is not constructed in a manner to enable quick and easy collapse of the structure while still completely assembled as is true with respect to the invention forming the subject matter hereof.

U.S. Pat. No. 4,045,040 discloses a wheeled game carrier structure, which can be connected to a back pack worn by a hunter so as to trail the wheeled carrier while the hunter wearing the back pack walks from one location to another. When desired, the carrier frame may be converted to a four-legged tripod-like stand having a seat at its upper end formed by the back pack, and on which a hunter may sit while watching for the approach of game, such as deer.

U.S. Pat. No. 4,373,737 relates to a game carrier that comprises simply a pair of parallel telescoping members which may be collapsed for storage, or which may be telescopically extended for use in carrying game. A pair of wheels are mounted on one end of the telescoping rail members to facilitate the transport of game.

U.S. Pat. No. 4,728,244 is directed to a structure that functions both as a roof rack for securement to an automobile for the purpose of carrying equipment, such as bicycles, and as a two-wheeled cart when off-loaded from the roof of an automobile and reassembed into a two-wheeled cart. It requires only a cursory review of this patented structure to show that there is very little resemblance in structure, function or mode of operation with the subject matter of the present invention.

U.S. Pat. No. 4,806,063 relates to a portable wild game hoist adapted to be attached to the rear portion of a vehicle having a conventional trailer hitch. The purpose stated is to facilitate skinning and dressing game at the kill site, rather than having to laboriously pack the carcass to some other location for this purpose.

All of the devices illustrated and described in the patents noted above appear to be limited in their structure and mode of operation to carrying heavy game, such as deer or elk. None of the structures depicted by these patents appear to relate to a wheeled carrier cart that may be collapsed while entirely assembled so as to facilitate loading of the decoy laden cart on the roof structure of a vehicle, and then enable off-loading of the laden cart, extension of the wheels to enable transport of the duck decoys to a place of use, and subsequent collapse of the wheels in relation to the frame to enable submersion of the entire structure in a pond so as to hide the structure from overflying game fowl attracted by the decoys.

Accordingly, the principal object of the invention is the provision of a light-weight wheeled cart that is collapsible while fully assembled to enable the wheeled cart to be transported on a vehicle in collapsed condition, or extended to enable use of the wheels to transport decoys to the place of use, and to then enable collapse of the wheels while still attached to the structure to enable submersion of the entire structure below the surface of a body of water.

Another object of the invention is the provision of a wheeled decoy cart that is fabricated to provide a frame having a nacelle within which up to 150 duck decoys, or 200 goose decoys may be carried, and which may also contain such items as an ice chest, food, guns, clothing and waders.

A still further object of the invention is the provision of a collapsible wheeled decoy cart that is fabricated from light-weight metal tubing and is provided with a pair of wheels that are centered longitudinally on the frame so as to enable easy handling of the cart by one person over various types of terrain or water.

A still further object of the invention is the provision of a wheeled duck or goose decoy cart that may be loaded on the ground, then with its wheels retracted, slid onto a vehicle rooftop, to serve temporarily as a storage rack while being transported to the location of use, whereupon it may be unloaded, while fully laden with decoys, by sliding the cart partially off the rooftop, extending and locking the wheels, then lowering the wheeled cart with wheels extended onto the ground so that it may be wheeled to the field or body of water, where the decoys may be offloaded and distributed, the wheels collapsed, and the cart camouflaged in the field or submerged in the water to hide it from overflying game fowl.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the collapsible wheeled carrier for duck or goose decoys comprises a generally rectangular rigid main frame having a pair of handles extending from one end. Pivotally depending medianly from opposite parallel main frame members are a pair of wheel assemblies, each assembly preferably including a triangular gusset structure having a base formed by a bearing sleeve coaxially and pivotally disposed on the associated main frame member and at its apex being joined to a bifurcated fork on which is rotatably journaled a wheel, such as a bicycle wheel. A depressed bottom or auxiliary frame is rigidly suspended below the main frame and includes a medianly positioned transversely extending rail on opposite ends of which are provided threaded bosses. Threaded flanges rotatably mounted on the triangular gusset adjacent its apex are adapted to threadably engage the threaded bosses to detachably retain the pair of wheels in parallel extended relationship with respect to each other and with respect to the overlying main frame. To collapse the cart, the flanges are detached from the threaded bosses, and each entire wheel assembly may then be independently swung outwardly from the main frame, or up and over the main frame member on which it is pivoted to place it within the confines of the main frame and supported on the auxiliary frame.

BRIEF DESCRIPTION OF THE DRAWINGS

FIG. 1 is a perspective view of the collapsible wheeled carrier with its wheels extended for use.

FIG. 2 is a perspective view similar to FIG. 1, but showing the wheeled carrier laden with multiple bags containing duck decoys.

FIG. 3 is a perspective view of the loaded wheeled carrier shown with the wheels rotated to overly the load.

FIG. 4 is a perspective view of the now unloaded wheeled carrier shown up-side-down with the main frame lying on the ground and one wheel swung outboard and lying in the same plane as the main frame and the other wheel swung inboard and also lying generally in the same plane as the main frame.

FIG. 5 is an enlarged fragmentary perspective view of the wheel assemblies and their relationship to the associated main frame members and the manner of detachable securement of the wheel assemblies to the opposite ends of the base rail member.

FIG. 6 is an enlarged fragmentary perspective view of the threaded end of the base rail and the rotatable flange that may be selectively engaged or disengaged from the threaded end of the base rail.

DESCRIPTION OF THE PREFERRED EMBODIMENT

In terms of greater detail, the collapsible wheeled carrier of the invention may of course be utilized to transport not only duck and goose decoys, but other items as well. The carrier is designated generally by the numeral 2, and includes a main frame 3 having elongated side members 4 and 5, held in spaced parallel relationship by parallel end members 6 and 7 welded to the side members as shown, the side and end members all lying in a common plane to define a generally rectangular first quadrilateral constituting the rigid main frame. Integral extensions 8 and 9 of the side members project axially beyond the associated end member 6 to form convenient handles that also lie in the plane of the main frame. Handle grips 10 and 11 are applied to the ends of the handles 8 and 9, respectively, to facilitate gripping the handles to maneuver the carrier as will hereinafter be explained.

Second and third quadrilateral chassis frames designated generally by the numerals 12 and 13 are trapezoidal in their configuration, each of the trapezoidal chassis frames 12 and 13 having a common base formed by a transversely extending base rail 14 medianly related to the longitudinal dimension of the main frame and spaced below the main frame approximately eighteen inches. Integral axially aligned threaded bosses 15 and 16 are provided on opposite ends of the transversely extending base rail 14 for a purpose which will hereinafter be explained. The trapezoidal chassis frame 12 is spaced below the main frame, and extends longitudinally in the direction of the handle-end of the main frame, having a transverse end rail 17 spaced from and parallel with the base rail 14, but shorter in length, and positioned medianly between but spaced below the side members of the main frame as shown. Opposite ends of the transverse end rail 17 are integrally joined by elongated side rails 18 and 19 with opposite ends of the transverse base rail 14, the union of the side rails and the base rail being inboard of the threaded bosses 15 and 16, respectively.

It will thus be seen that the integrally joined base, end, and side rails lie in a common plane and form a trapezoidal chassis frame 12 that is rigidified and strengthened by transverse longitudinally spaced crossrails 20 and 21 welded at opposite ends to the side rails 18 and 19 as shown. Added strength and resistance to distortion stresses is provided by a longitudinally extending medianly positioned rail 22 welded between the base rail 14 and the transverse cross-rail 21 as shown.

The trapezoidal chassis frame 12 thus formed is integrally joined to the handle-end of the main frame by spacer rails each integrally welded at one end to the side rails of the chassis frame and at its opposite end welded to the associated side member of the main frame. Thus, referring to FIG. 1, it will be seen that the opposite ends of end rail 17 are integrally joined by spacer rails 23 and 24 to the side members 4 and 5, respectively. It should also be noted that the spacer rails are welded to the associated side members adjacent the end rail 6, and that the lengths of the spacer rails are equal to each other but longer than the spacing of the base rail 14 below the main frame. This results in the chassis rail 12 being inclined with respect to the main frame, diverging therefrom in the direction of the handle-end of the main frame. Two additional spacer rails 25 and 26 are interposed between the side rail 18 and the side member 4, each being relatively shorter than the previous one to compensate for the convergence of the side rail 18 toward the side member 4. In like manner, two relatively shorter spacer rails 27 and 28 are rigidly interposed by welding between the side rail 19 and the side member 5 as shown.

The trapezoidal chassis frame 13 is constructed similarly to the chassis frame 12, with the exception that it is somewhat shorter, having an end rail 29 remote from the handle-end of the main frame, and disposed below the main frame end member 7 an amount approximately equal to the spacing of the end rail 17 below the associated main frame end member 6. Opposite ends of the end rail 29 are joined integrally by spacer posts 30 and 31 with opposite corners, respectively, of the main frame associated with the main frame end member 7 as shown. Like the end rail 17, the end rail 29 is shorter than the associated main frame end member 7, and is medianly disposed with respect thereto and spaced below the end member 7 a predetermined distance, about ten inches, thus causing the chassis frame 13 to diverge in relation to the main frame from the base rail 14 toward the end member 7 and the end rail 29.

The trapezoidal configuration of this chassis frame 13 is completed by the integral interposition of side rails 32 and 33 between opposite ends of the base rail 14 and the opposite ends of the end rail 29. In the same manner that the side rails 18 and 19 of the chassis frame 12 converge toward the end rail 17, the side rails 32 and 33 of the chassis frame 13 converge toward each other in the direction of the associated end rail 29 while diverging from the main frame. For added stability and rigidity, an intermediate spacer rail 34 integrally joins the midpoint of the end rail 29 with the midpoint of the end member 7 as shown. Added rigidity and strength is provided by intermediate side spacer rails 35 and 36 joining, respectively, the associated side members 4 and 5. A horizontal cross-rail 37 extends transversely of the chassis frame parallel to the end rail 29 and the base rail 14, and integrally joins at opposite ends with side rails 32 and 33.

It will thus be apparent that the carrier of the invention includes a quadrilateral main frame in the form of an elongated rectangular perimeter, joined integrally by two quadrilateral chassis frames each of which is formed in a trapezoidal configuration, with the two chassis frames sharing a commong base member or rail and each converging away from the common base, and diverging from the associated end portion of the main frame. The two conjoined chassis frames thus form a bottom frame structure for the carrier that slopes from the base rail 14 toward opposite ends of the carrier frame.

To provide rolling mobility to the carrier frame thus formed and described, a pair of wheel assemblies designated generally by the numerals 38 and 39 are provided. As shown, each wheel assembly is attached permanently but pivotally to the main frame, and selectively attachable or detachable in relation to the bottom frame structure of the carrier, and specifically the base rail 14.

As shown in FIGS. 1, 5 and 6, each wheel assembly includes an elongated bearing sleeve 40 pivotally mounted concentrically on an associated side member of the main frame and restrained against axial displacement by abutment members 41 and 42 associated adjacent opposite ends of the bearing sleeve and welded or otherwise secured permanently to the associated side member. Welded to each bearing sleeve is a generally triangular gusset structure designated generally by the numeral 43 and including a pair of converging strengthening ribs 44 and 45 and an intermediate rib 46, the gusset structure 43 converging to an apex 47. Additional strength is provided the gusset structure by plates 48 and 49 welded between the converging ribs and the bearing sleeve 40 as shown.

Welded to the apexes of the gusset structures of the wheel asemblies 38 and 39 are wheel-receiving forks 50 and 51, respectively. The forks 50 and 51 detachably accommodate wheels 52 and 53, respectively, in the nature of bicycle wheels, the wheel axles being detachably secured to the lower ends of the forks by appropriate nuts, and the wheels being provided with appropriate pneumatic tires 54 and 55, respectively.

From the above it will be apparent that each wheel assembly 38 and 39 is enabled to swing about the associated side member on which it is pivotally mounted by the bearing sleeve 40 through an arc of approximately 270 degrees to enable arrangement in the extended condition of use illustrated in FIGS. 1, 2 and 5, in which the wheel assemblies are detachably secured to opposite ends of the base rail 14 as will hereinafter be explained, or detached and swung into the condition of collapsed disuse as illustrated in FIGS. 3 and 4.

To detachably lock the wheel assemblies 38 and 39 in the extended position of use illustrated in FIGS. 1, 2 and 5, there is provided inboard on the wheel assemblies, specifically, located at the apexes of the gusset structures, rotatable threaded flanges 56 and 57, the internal threads of which engage the external threads of the threaded bosses 15 and 16, respectively. This detachable coupling is illustrated in detail in FIG. 6. It will be readily apparent that this detachable coupling may be assembled without the use of tools, it requiring only finger pressure to securely join the two parts of each coupling. In like manner, it requires only finger pressure to disassemble the coupling so as to enable pivotal repositioning of the wheel assemblies through about 120 degrees into the attitude illustrated in FIG. 3, which is particularly advantageous for carrying the loaded carrier on the rooftop of a transporting vehicle, or into the attitude illustrated in FIG. 4, wherein one of the wheel assemblies has been swung outwardly from the main frame approximately 90 degrees and lies generally in the same plane as the main frame, while the other wheel assembly has been swung inwardly approximately 270 degrees to lie within the frame of the carrier. In this position, it will be understood that the wheeled carrier may be covered with grass when used in a field, or may be submerged in a body of water, in both instances rendering the wheeled carrier more difficult to see by overflying game fowl.

When carried on a rooftop of a vehicle, it is advantageous if selected rail members of the chassis frames be provided with protective padding in the form of cylindrical cushion material 58. Here, such cushion material is shown applied to the side rails 32 and 33 of the chassis frame 13, to the base rail 14, and to the end rail 17 of the chassis frame 12. The cushion material is preferably moisture impervious synthetic resinous material, such as closed-cell polyurethane, or an equivalent material that is abrasion resistant.

In use, the collapsible wheeled carrier of the invention is arranged in the attitude illustrated in FIG. 1 and then loaded with multiple bags of decoys as shown in FIG. 2. The loaded carrier may then easily be wheeled to the rear end of a vehicle, such as an automobile or stationwagon or pickup truck, and the end rail 29 of the chassis frame 13 propped against the rooftop of the vehicle or the tailgate or bed of the pickup truck. In this attitude, the grip ends of the handles will rest on the ground. The threaded flanges 56 and 57 are then released from the threaded bosses and the wheel assemblies are swung upwardly over the load of decoys into the attitude illustrated in FIG. 3, where they may be appropriately tied to secure the collapsed wheel assemblies to the load and the load to the carrier frame. The grip-end of the handles 8 and 9 may now be lifted to lever the loaded carrier onto the rooftop or truck bed, sliding the loaded carrier forward until it is properly positioned, whereupon it is tied to the vehicle.

To off-load the loaded carrier, all that is required is that the reverse procedure be followed, the wheels being extended and the flanges 56 and 57 engaged with the threaded bosses while the handle ends are resting on the ground and the opposite end of the carrier frame is still propped on the vehicle. With the wheel assemblies in extended position, the loaded carrier frame may now be lowered until the wheels contact the ground, whereupon the loaded carrier may be wheeled easily to a desired location where the decoys may be distributed and the wheeled carrier collapsed and camouflaged.

Having thus described the collapsible wheeled carrier for decoys forming the subject matter of the invention, what is believed to be new and novel, and sought to be protected by Letters Patent of the United States is as follows.

I claim:

1. A collapsible wheeled carrier for normally rollably transporting articles, comprising:
   a) A main frame including a pair of laterally spaced elongated members;
   b) a bottom frame structure joined to said main frame and with said main frame defining a nacelle within which articles to be transported may be retained; and
   c) a pair of wheel assemblies pivotally mounted on said main frame and detachably engageable to said bottom frame structure to retain said wheel assemblies normally in position of use and selectively detachable therefrom to enable pivotal displacement of said wheel assemblies to collapsed positions of disuse for storage or transport of said wheeled carrier;
   d) each said wheel assembly of said pair thereof including a bearing sleeve pivotally mounted on an associated one of said elongated side members, a gusset structure secured to said pivotal bearing sleeve and pivotal therewith about said associated side member, a bifurcated fork fixed to said gusset structure on the end thereof remote from said bearing sleeve, a wheel/tire assembly detachably mounted on said bifurcated fork, and means on each said gusset structure adjacent said bifurcated fork thereon for detachable engagement with said bottom frame structure to retain said wheel assemblies in position of use.

2. The collapsible wheeled carrier according to claim 1, wherein said gusset structure is triangular having a base welded to said bearing sleeve and an apex end remote therefrom, said means on each gusset structure for detachable engagement with said bottom structure comprising a threaded rotatable flange, and complementarily threaded bosses on said bottom frame structure selectively engageable by said threaded rotatable flanges.

3. A collapsible wheeled carrier for normally rollably transporting articles, comprising:
   a) a main frame including a pair of laterally spaced elongated side members;
   b) a bottom frame structure joined to said main frame and with said main frame defining a nacelle within which articles to be transported may be retained; and
   c) a pair of wheel assemblies pivotally mounted on said main frame and detachably engageable to said bottom frame structure to retain said wheel assemblies normally in position of use and selectively detachable therefrom to enable pivotal displacement of said wheel assemblies to collapsed positions of disuse for storage or transport of said wheeled carrier;
   d) said bottom frame structure comprising a pair of chassis frames conjoined medianly of said main frame and extending in the direction of opposite ends of said elongated side members; and
   e) each of said chassis frames possessing a trapezoidal configuration sharing a common base rail, and side rails on each chassis frame converging from said base rail toward an end rail remote from said base rail.

4. A collapsible wheeled carrier for normally rollably transporting articles, comprising:
   a) a main frame including a pair of laterally spaced elongated side members;
   b) a bottom frame structure joined to said main frame and with said main frame defining a nacelle within which articles to be transported may be retained; and
   c) a pair of wheel assemblies pivotally mounted on said main frame and detachably engageable to said bottom frame structure to retain said wheel assemblies normally in position of use and selectively detachable therefrom to enable pivotal displacement of said wheel assemblies to collapsed positions of disuse for storage or transport of said wheeled carrier;
   d) said bottom frame structure comprising a pair of chassis frames conjoined medianly of said main frame and extending in the direction of opposite ends of said elongated side members;
   e) said pair of chassis frames sloping away from their conjoined union medianly of said main frame and diverging from said main frame in the direction of opposite ends of said elongated side members.

5. A collapsible wheeled carrier for normally rollably transporting articles, comprising:
   a) a main frame including a pair of laterally spaced elongated side members;
   b) a bottom frame structure joined to said main frame and with said main frame defining a nacelle within which articles to be transported may be retained;
   c) a pair of wheel assemblies pivotally mounted on said main frame and detachably engageable to said bottom frame structure to retain said wheel assemblies normally in position of use and selectively detachable therefrom to enable pivotal displacement of said wheel assemblies to collapsed positions of disuse for storage or transport of said wheeled carrier;
   d) said bottom frame structure including a base rail extending transverse to and below said main frame, and said pair of wheel assemblies are normally detachably secured to opposite ends of said base rail when in position of use; and
   e) threaded bosses are provided on opposite ends of said base rail, and complementarily threaded rotatable flanges are provided on said wheel assemblies selectively engageable with said threaded bosses to detachably retain said wheel assemblies in position of use and selectively detachable from said threaded bosses to effect collapse of said carrier.

6. A collapsible wheeled carrier for normally rollably transporting articles, comprising:
   a) a main frame including a pair of laterally spaced elongated side members;
   b) a bottom frame structure joined to said main frame and with said main frame defining a nacelle within which articles to be transported may be retained; and
   c) a pair of wheel assemblies pivotally mounted permanently on said main frame and detachably engageable to said bottom frame structure to retain said wheel assemblies normally in postion of use and selectively detachable therefrom to enable pivotal displacement of said wheel assemblies to collapsed positions of disuse for storage or transport of said wheeled carrer;

d) said bottom frame structure including a base rail extending transverse to and below said main frame, and said pair of wheel assemblies normally detachably secured to opposite ends of said base rail when in position of use.

7. The collapsible wheeled carrier according to claim 6, wherein said main frame comprises a generally rectangular quadrilateral, and integral extensions of said laterally spaced elongated side members constitute handles to facilitate manipulation of the carrier.

8. The collapsible wheeled carrier according to claim 6, wherein said bottom frame structure comprises a pair of chassis frames conjoined medianly of said main frame and extending in the direction of opposite ends of said elongated side members.

* * * * *